United States Patent [19]

Gerold et al.

[11] Patent Number: 4,797,056

[45] Date of Patent: Jan. 10, 1989

[54] SAFETY BRAKE FOR CEMENT TRUCK CHUTE

[76] Inventors: Charles Gerold, 2839 Ilopango, Hacienda Heights, Calif. 91740; John Gregorio, 1533 E. Dexter, Covina, Calif. 91724

[21] Appl. No.: 75,131

[22] Filed: Jul. 20, 1987

[51] Int. Cl.⁴ .............................................. B65G 67/24
[52] U.S. Cl. ..................................... 414/467; 193/23; 188/72.4; 188/72.8; 298/7; 414/537
[58] Field of Search ....................... 193/16, 22, 23, 24; 414/537, 467, 744 R, 694; 298/7; 188/72.6, 72.8

[56] References Cited

U.S. PATENT DOCUMENTS

| | | | |
|---|---|---|---|
| 1,500,520 | 7/1924 | Neander | 193/23 |
| 2,672,327 | 3/1954 | Oury | 193/23 X |
| 2,888,103 | 5/1959 | Armstrong | 188/72.4 |
| 3,908,843 | 9/1975 | Noller et al. | 414/694 |
| 3,976,168 | 8/1976 | Yamamoto | 188/72.8 X |

FOREIGN PATENT DOCUMENTS 1079159  11/1954  France ..................... 298/7

Primary Examiner—Frank E. Werner
Attorney, Agent, or Firm—Charles H. Thomas

[57] ABSTRACT

A safety brake is provided for a cement truck chute to immobilize the chute from lateral movement relative to the cement truck chassis. Movement of the cement truck chute is controlled by a ram which is secured to a vertically oriented ram pivot axle rotatably mounted in a sleeve secured to the truck chassis. A first horizontal brake pad is located concentrically about the ram pivot axle and is immobilized relative to the chassis. The safety brake includes a pneumatic actuator having a housing and a plunger actuable for reciprocal movement relative to the housing. A flat, horizontal ram coupling plate is rigidly secured to the ram pivot axle and holds the pneumatic actuator housing at a spaced elevation thereabove with the pneumatic actuator plunger coaxially aligned with the ram pivot axle. A horizontal intermediate plate is located between the ram coupling plate and the pneumatic actuator housing and is secured to the pneumatic actuator plunger. Guide posts extend through guide openings in the ram coupling plate to join the intermediate plate to the second brake pad. When actuated, the pneumatic actuator plunger forces the intermediate plate down, thus pressing the second brake pad against the first to immobilize the ram from rotation relative to the cement truck chassis.

11 Claims, 2 Drawing Sheets

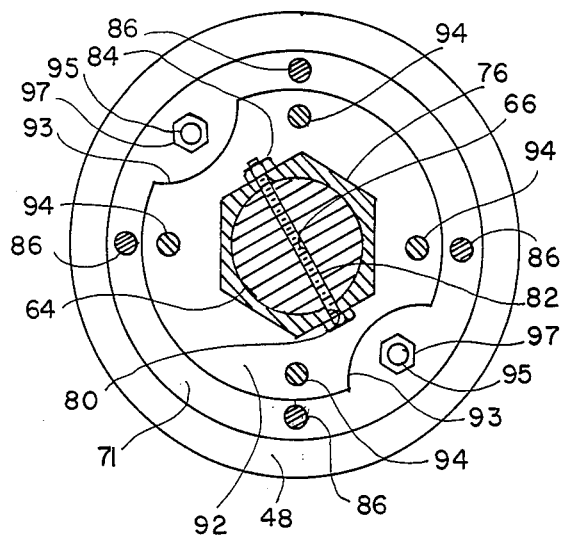
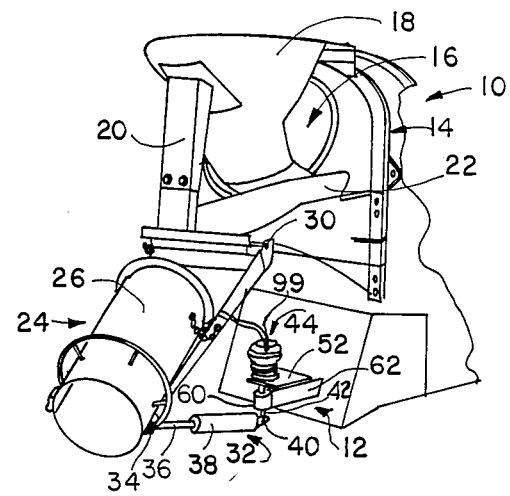
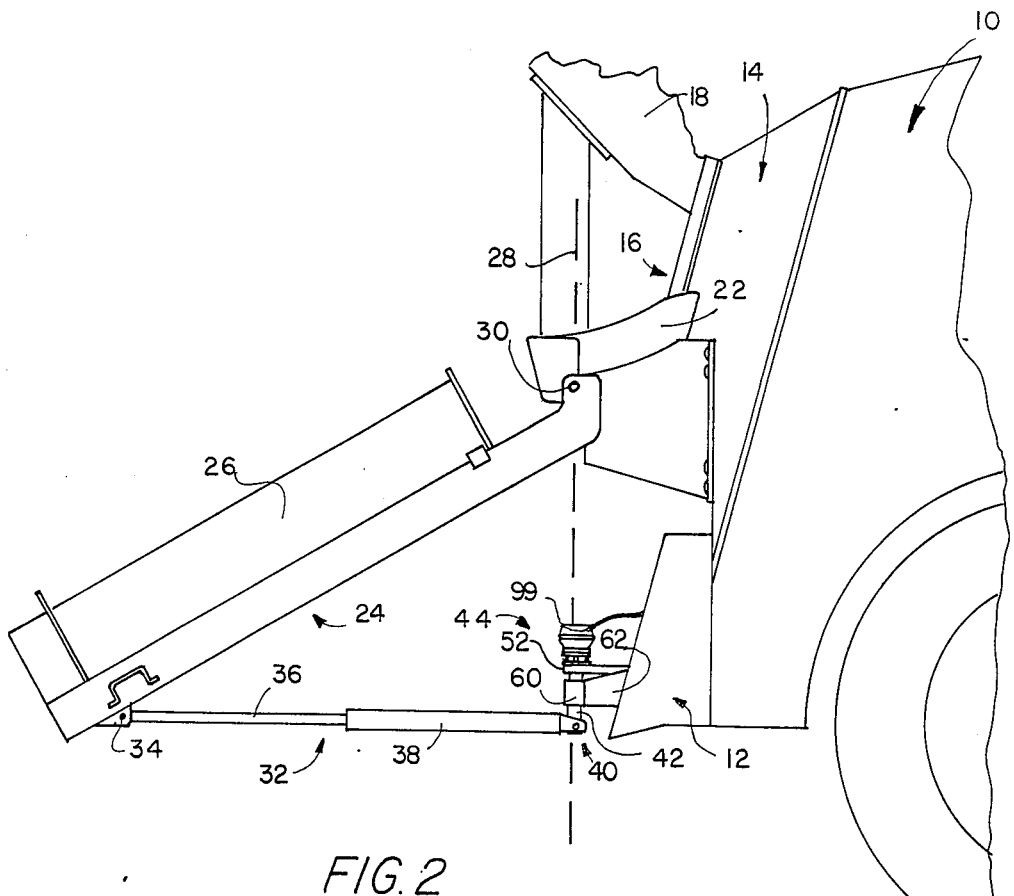

SAFETY BRAKE FOR CEMENT TRUCK CHUTE

BACKGROUND OF THE INVENTION

1. Field of the Invention

The present invention relates to a safety brake for use in immobilizing the chute of a cement truck from lateral rotatation relative to the cement truck chassis.

2. Description of the Prior Art

In the construction of concrete foundations, roadways, sidewalks, bridges, and numerous other civil engineering construction projects, premixed concrete is transported in slurry form to a job site in a cement truck. A cement truck includes a very large mixing drum which rotates upon the cement truck chassis to continuously mix the aggregate and cement as the premixed concrete slurry is transported to the construction site. The rear extremity of the rotatable mixing drum of a cement truck tapers to form an opening from which the uncured concrete is poured at the job site. A conventional cement truck includes a pneumatically or hydraulically operated system for tilting the drum rearwardly in order to pour the premixed, uncured concrete from the mixing drum. The flowing concrete slurry is guided by a hopper, which is secured relative to the cement truck chassis, into a discharge chute, likewise connected to the cement truck chassis. The upper extremity of the discharge chute is positioned to receive concrete mix from the discharge hopper.

To minimize the time and labor involved in pouring concrete, the chute is provided with a system of extensions to direct flowing concrete mix from the discharge hopper directly into the forms in which the concrete is to be cured. Oftentimes the desired direction of discharge is laterally to one side or the other of a cement truck.

In order to have the flexibility to direct flowing concrete mix in various directions to the rear and to either side of the body of the cement truck, the chute is pivotally mounted relative to the chassis so that it can be rotated about both horizontal and vertical axes. Rotation about the vertical axis swings the chute from side to side in order to laterally discharge the concrete mix to a desired location. Rotation of the chute about a horizontal axis adjusts the angle of inclination of the chute. The desired angle of inclination will vary with the distance from the cement truck at which the concrete mix is to be deposited.

In conventional cement trucks, adjustment of the angle of inclination and rotation of the chute about a horizontal axis is controlled by a pneumatic ram. Such a ram includes a piston movable within a pneumatic cylinder. The ram is connected to the chute at some distance from the axis of rotation of the chute relative to the cement truck chassis. Lateral positioning of the chute to rotate about a vertical axis is normally performed manually. That is, the chute is manually pushed laterally by hand in rotation about a vertical axis to a desired orientation relative to the longitudinal axis of the cement truck chassis. The end of the ram remote from the chute is connected to a vertical ram pivot axle which is rotatably mounted within a sleeve or collar that is rigidly secured to the cement truck chassis.

In conventional practice, the ram pivot axle is equipped with a hydraulic or pneumatic brake, which is provided in order to prevent the ram pivot axle, the ram, and the chute from rotating about a vertical axis once the chute has been moved laterally to the desired position. Some of the more widely used cement truck chute brakes are marketed under the names Challenge, Rex and McNealis.

Very significant problems exist in the operation and maintenance of conventional cement truck chute brakes. Conventional brakes which are commercially available tend to rapidly become clogged with pieces of aggregate. The cork brake pads employed rapidly deteriorate due to the abrasion caused by grinding the chunks of concrete therebetween. After use for only a short time the conventional brakes, which are presently commercially available to prevent the ram pivot axle from rotating, become virtually ineffective.

Conventional cement chute safety brakes become clogged with layers of grout and cement and frequently bind up even when deactuated. When this occurs the cement chute can be rotated from side to side only by first dislodging the grout and concrete from the safety brake. This is normally done by beating and pounding on the layers of cement and grout with a hammer or other heavy implement. While this technique for removal of accummulated matter obstructing movement of the cement chute is an expeditious way to free up the brake, very typically this technique results in severe damage to the brake and prevents proper operation of the brake thereafter.

SUMMARY OF THE INVENTION

The present invention is an improved safety brake for immobilizing a cement truck chute from rotation about a vertical axis. The design of the cement chute brake of the invention provides a far superior, positive locking system as contrasted with conventional brakes which have heretofor been provided for the same purpose. The improved safety brake of the invention may be used for long of periods of time without deteriorating or becoming damaged as is the case with conventional cement chute safety brakes.

In one broad aspect the present invention is a safety brake for a discharge chute on a cement truck in which the chute is attached to the truck by a pivotal coupling and wherein the chute is controlled in movement by a ram which is secured between the chute and a pivot axle rotatably mounted in a sleeve secured to the cement truck chassis. The improved safety brake is comprised of a pneumatic actuator having a housing and having an actuator stud which is movable under pneumatic control in reciprocation relative to the housing. A first brake pad is secured relative to the cement truck chassis, and a second brake pad is secured to the actuator stud and is juxtaposed proximate to the first brake pad in facing relationship relative thereto. According to the invention, a means is provided for rigidly connecting the pneumatic actuator housing to the pivot axle, whereby pneumatic actuation and deactuation of the actuator moves the brake pads between a clamped condition in which the pads are pressed together immobilized from movement relative to each other, and a retracted condition in which the brake pads are separated from each other to permit rotation of the second brake pad relative to the first brake pad.

In another broad aspect the invention may be considered to be an improvement to a cement truck having a chassis, a discharge chute mounted for rotation relative to the chassis, a ram coupled to the chute for controlling movement of the chute, a pivot axle connected to the ram remote from the chute, a mounting sleeve carrying the pivot axle and secured to the chassis, and a pneumatically actuated brake interposed between the truck chassis and the pivot axle. The pneumatically actuated brake prevents rotation of the ram and the pivot axle relative to the mounting sleeve and the chassis when actuated. The brake permits rotation of the ram and pivot axle relative to the mounting sleeve and the chassis when deactuated. The brake has a first brake pad means secured relative to the chassis and a second brake pad means releasably engagable with the first brake pad means. According to the improvement of the invention, a pneumatic actuator is provided having a casing and a pneumatic actuator plunger projecting from the casing. The plunger is reciprocally movable relative to the casing. Means are provided for rigidly joining the pneumatic actuator casing to the pivot axle, and further means are provided for connecting the second brake pad means to the actuator plunger The invention may be described with greater clarity and particularity by reference to the accompanying drawings.

DESCRIPTION OF THE DRAWINGS

FIG. 1 is a perspective view of the rear portion of an improved cement truck according to the invention.

FIG. 2 is a side elevational view of the rear portion of the improved cement truck of FIG. 1.

FIG. 5 is a sectional plan view taken along the lines 5—5 of FIG. 4.

DESCRIPTION OF THE EMBODIMENT

Figure 3:
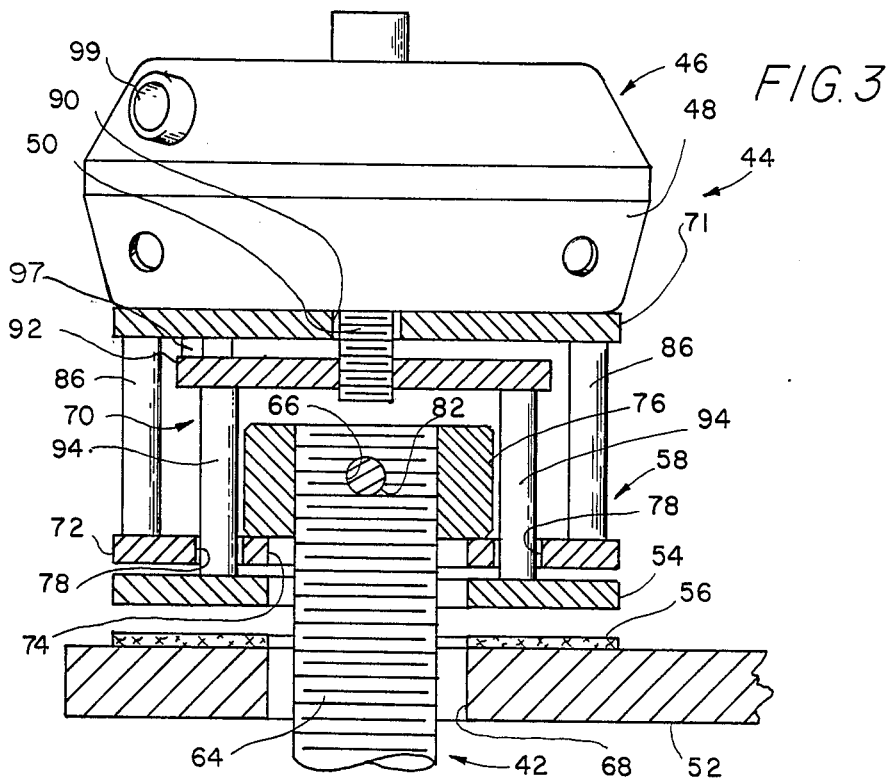
FIG. 3 is a sectional elevational view showing the safety brake of the invention in a deactuated condition.

FIGS. 1 and 2 illustrate a portion of a cement truck, indicated generally at 10. The cement truck 10 has a chassis indicated generally at 12 and including rigid structural frame members at the rear of the truck 10. The cement truck 10 has a large rotatable mixing drum 14 which has a charging and discharging mouth 16 at its rear extremity. A charging hopper 18 is provided and is supported relative to the chassis 12 by a hopper support 20. The charging hopper 18 receives a slurry of concrete mix, including aggregate and cement, from a central supply location. While the cement truck 10 travels to a job site the mixing drum 14 is rotated, thereby continuously mixing the concrete mix.

The cement truck 10 also has a discharge hopper 22 located beneath the charging hopper 18. The discharge hopper 22 serves as a funnel which empties into a concrete discharge chute 24. The concrete discharge chute 24 is generally of a semi-cylindrical configuration, and includes a fold-over canopy 36. The discharge chute 24 is mounted for rotation relative to the chassis 12 about vertical and horizontal axes, indicated at 28 and 30 respectively, in FIGS. 1 and 2.

The cement truck 10 is also equipped with a ram 32 which is coupled to the discharge chute 24 at a rotatable hinge connection 34. The ram 32 is pneumatically operated and has a piston 36 which reciprocates into and out of a cylinder 38. The ram 32 is joined by a clevis connection 40 to a flat connecting flange which extends downwardly from an otherwise cylindrical pivot axle 42.

The invention is an improvement to the cement truck 10 in the form of a safety brake indicated generally at 44. The safety brake 44 is comprised of a pneumatic actuator 46 which has a generally drum-shaped housing or casing 48 and an externally threaded actuator stud or plunger 50. The plunger 50 is movable under pneumatic control in reciprocation relative to the housing 48 as depicted in FIGS. 3 and 4

The pneumatic actuator 46 employed is preferably a pneumatically operated truck service brake which contains a caged spring and which is typically sold as an emergency or parking brake for a truck. The interior of the casing 48 of the pneumatic actuator 46 is horizontally divided into an upper pneumatic chamber and a lower spring chamber by a heavy-duty internal diaphragm. A large compression spring is located in the spring chamber in the lower portion of the casing 48 and presses upwardly against the internal diaphragm to retract the plunger 50 relative to the casing 48. The spring is typically compressed under fifteen hundred to three thousand pounds pressure. Pneumatic pressure of one hundred pounds per square inch is typically employed to actuate the pneumatic actuator 46 to drive the plunger 50 from the position of FIG. 3 to the position of FIG. 4. One suitable pneumatic actuator is commercially available as the Anchorlok Combination Service Spring Brake, sold by Lear Siegler, Inc. the 20 Truck Products Division located in Compton, Calif.

Figure 4:
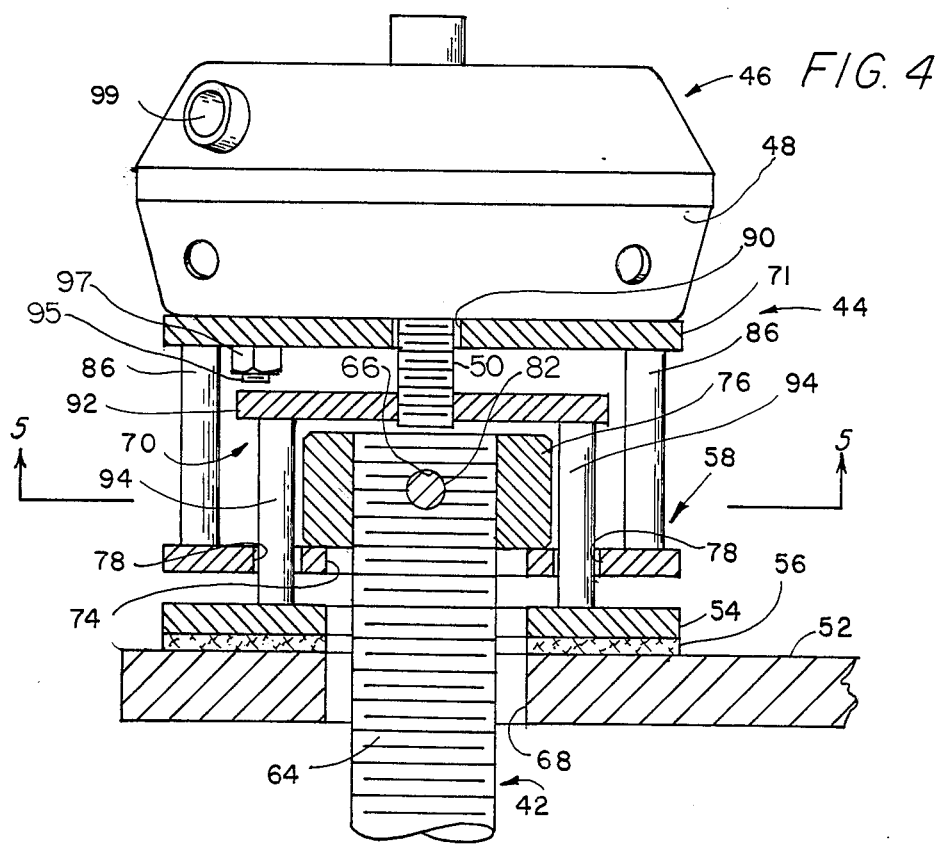
FIG. 4 is a sectional elevational view showing the safety brake of the invention in an actuated condition.

The safety brake 44 also includes a first brake element or pad 52 secured relative to the cement truck chassis 12 and a second brake element or pad 54 secured to the plunger or actuator stud 50 and juxtaposed proximate to the first brake pad 52 in facing relationship therewith as depicted in FIGS. 3 and 4. The first brake element 52 may include a cork lining 56, although the improved safety brake 44 is totally operable without the lining 56 utilizing only metal-to-metal contact between the first brake pad 52 and the second brake pad 54.

The improved safety brake 44 also includes a first means, indicated generally at 58, for rigidly connecting the pneumatic actuator housing 48 to the ram pivot axle 42, whereby pneumatic actuation and deactuation of the actuator 46 moves the brake pads 52 and 54 between a clamped condition in which pads are pressed together immobilized from movement relative to each other as depicted in FIG. 4, and a retracted condition in which the brake pads 52 and 54 are separated from each other to permit rotation of the second brake pad 54 relative to the first brake pad 52, as depicted in FIG. 3. Another or second means, indicated generally at 70, connects the second brake pad 54 to the pneumatic actuator plunger 50.

As best illustrated in FIGS. 1 and 2, the first brake element 52 is secured in a horizontal disposition and is rigidly secured relative to the truck chassis 12. The vertically oriented ram pivot axle 42 is rotatably mounted within a cylindrical annular sleeve 60, which is welded to a rearwardly extending mounting bracket 62, that in turn is welded or bolted to the truck chassis 12.

The ram pivot axle 42 has a flat, central downwardly depending flange which fits between a pair of clevis arms at the free end of the ram cylinder 38 and is held therebetween in a rotatable fashion by a transverse bolt at the clevis connection 40. Above the connecting flange at the clevis connection 40 the ram pivot axle 42 is of cylindrical configuration. The upper end of the ram pivot axle 42 terminates in an externally threaded post 64 which is one and one-half inches in nominal diameter. A transverse bore 66 is defined completely through the threaded post 64 near its upper extermity.

The post 64 extends upwardly within an opening 68 formed in the first brake element 52.

The first means 58 for connecting the pneumatic actuator housing 48 to the pivot axle 42 is comprised of a first disk-shaped plate 71 and a second disc-shaped, annular ram coupling plate 72 rigidly coupled to the plate 71 and held in spaced separation therefrom. The ram coupling plate 72 is also rigidly joined to the ram pivot axle 42.

The ram coupling plate 72 is preferably a disc-shaped annular steel plate three-eighths of an inch in thickness and six inches in outer diameter. A central opening 74, greater than one and one-half inches in diameter, is defined in the ram coupling plate 72. A one and one-half inch inner diameter hexagonal steel nut 76 is welded to the top surface of the ram coupling plate 72, centered over the opening 74 therethrough. The ram coupling plate 72 also includes four guide openings, holes or apertures 78 defined therethrough and located ninety degrees apart. The guide openings 78 are each one-half of an inch in diameter and are centered a distance of one and one-half inches from the center of the ram coupling plate 72.

The hexagonal nut 76 is internally threaded to threadably engage the threaded post 64 of the ram pivot axle 42. A transverse bore 80 is drilled diametrically through the hexagonal nut 76 and is of a diameter equal to the transverse bore 66 in the threaded post 64. In the assembly of the safety brake 44, the threaded post 64 and the hexagonal nut 76 are threadably advanced together until the transverse bores 80 and 66 are brought into coaxial alignment. A bolt 82 is then inserted through the transverse bores 80 and 66 and is secured by a locking nut 84. The transverse bolt 82 ensures that the ram coupling plate 72 is always rigidly connected to the ram pivot axle 42. The bolt 82 prevents the hexagonal nut 76 and the threaded post 64 from turning relative to each other.

The first means 58 for rigidly joining the pneumatic actuator casing 48 to the pivot axle 42 also includes four cylindrical steel connecting posts 86. The connecting posts 86 are constructed of solid cylindrical steel stock one-half inch in diameter and three inches in length. The connecting posts are welded to the periphery of the ram coupling plate 72, preferably centered two and one-half inches from the center of the ram coupling plate 72. The purpose of the connecting posts 86 is to hold the ram coupling plate 72 in spatial separation from the plate 71 and the pneumatic actuator casing 48.

The first horizontal disc-shaped plate 71 of the first means 58 is constructed of solid steel three-eighths of an inch in thickness. This first plate 71 resides in juxtaposition in contact against the undersurface of the casing 48 of the pneumatic actuator 46 and is perpendicular to the orientation of the reciprocal plunger 50. The plate 71 has a central aperture 90 therethrough which is 0.75 inches in diameter and though which the reciprocal plunger 50 projects.

The plate 71 also includes peripheral apertures of a diameter and spacing adapted to receive the fastening studs which project from the underside of the most popular commercially available actuators. Two peripheral holes, 0.265 inches in diameter, are formed through the plate 71 and are diametrically opposite each other and spaced 0.875 inches apart. Four additional holes 0.51 inches in diameter and located equidistant from each other are spaced in diametrically opposite pairs five inches apart and forty five degrees from the closest 0.625 inch diameter hole. When the plate 71 is equipped with the peripheral apertures as described, it will accommodate many of the most widely used types of commercially available pneumatic actuators 46.

The second means 70 which connects the second brake pad 54 to the actuator plunger 50 is comprised of an intermediate horizontal plate 92 located between the first and second plates 72 and 71, respectively, and guide posts 94 that extend from the intermediate plate 92 to the second brake element 54. The guide posts 94 move in vertically reciprocal fashion through the guide openings 78 in the ram coupling plate 72 during actuation and deactuation of the pneumatic actuator 46.

The intermediate plate 92 is likewise constructed of 0.375 inch thick steel and is generally of disc-shaped configuration, four inches in outer diameter, with a 0.375 inch tapped bore at its center. The central bore of the intermediate plate 92 is internally tapped for threaded engagement with the pneumatic actuator plunger 50. The guide posts 94 are constructed of solid steel 0.438 inches in diameter and three inches in length. The guide posts 94 are spaced ninety degrees apart and are centered 1.5 inches from the center of the intermediate plate 92.

The outer periphery of the intermediate plate 92 is not completely circular, but rather has a pair of concave recesses 93 defined therein a distance of one-half inch, as depicted in FIG. 5. These concave, peripheral recesses 93 are accurately formed at a radius of 1.25 inches and are centered for alignment with the 0.625 inch peripheral holes in the plate 71. The arcuate recesses in the periphery of the intermediate disc 92 are provided to accommodate the lengths of the fastening studs 95 and the securing nuts 97 which are necessary to secure the fastening studs 95 to the plate 71 on some of the most widely available pneumatic actuators which can be utilized as the pneumatic actuator 46.

The guide posts 94 which extend through the guide openings 78 in the ram coupling plate 72 are reciprocal relative thereto and rigidly join the intermediate plate 92 to the second brake pad 54. The second means 70 is thereby movable in vertical reciprocation relative to the first means 58.

The safety brake 46 serves as a cement truck discharge chute locking system for preventing lateral rotatation of the chute ram 32 relative to the truck chassis 12. During travel of the cement truck 10 when the discharge chute 24 is elevated and latched in the raised position, the pneumatic actuator 46 is normally deactuated, and the horizontally disposed first and second brake elements 52 and 54 reside in vertically spaced separation, as depicted in FIG. 3. When the cement truck 10 arrives at a job site to discharge concrete mix, the chute 24 is lowered to the position depicted in FIGS. 1 and 2 by means of the ram 32. The pneumatic actuator 46 is maintained in the deactuated condition of FIG. 3 until the chute 24 has been swung laterally about the vertical axis 28 to a desired disposition relative to the longitudinal alignment of the cement truck 10 in order to discharge the concrete slurry mix therefrom. Once the chute 24 has been positioned as desired, pneumatic pressure is applied to the pneumatic inlet port 99 of the pneumatic actuator 46. The application of pressure to the pneumatic actuator 46 drives the plunger 50 and the second means 70 from the position of FIG. 3 to the position of FIG. 4. The second brake element 54 is thus forced firmly against the first brake element 52.

Upon actuation of the pneumatic actuator 46 to the position of FIG. 4, the brake elements 52 and 54 are totally immobilized relative to each other. Since the brake element 54 is thus totally immobilized from rotation relative to the truck chassis 12, the first means 58 is likewise totally immobilized from rotation, since the guide posts 94 prevent the ram coupling plate 72 from rotating. Since the ram pivot axis 42 is locked to the ram coupling plate 72 by means of the nut 76 and the bolt 82, the ram pivot axle 42 is totally immobilized from rotation as well. Thus, with the safety brake of the invention engaged as depicted in FIG. 4, rotation of the ram 32 and the chute 24 about the vertical axis 30 relative to the vehicle chassis 12 is impossible.

When pneumatic pressure to the pneumatic actuator 46 is released, the powerful, compressed spring within the casing 48 retracts the plunger 50, thus drawing the second means 70 vertically upwardly so that the first and second brake elements 52 and 54 are again spaced in vertical separation from each other, as depicted in FIG. 3. With the pneumatic actuator 46 deactuated as depicted in FIG. 3, the ram 32 and the ram pivot axle 42 can be freely pushed manually and rotated about the vertical axis 28 relative to the vehicle chassis 12. Since the first and second means 58 and 70 and the pneumatic actuator 46 are all rigidly immobilized from rotation relative to each other, they move in rotation with the ram pivot axle 42. The chute 24 and the ram 32 can thereupon be moved from side to side to reposition the chute 24 as desired.

The safety brake of the invention provides a rugged, reliable locking system for preventing undesired lateral rotation of a cement truck discharge chute and of a controlling ram relative to the truck chassis while concrete is being poured into forms. In contrast to conventional discharge chute locking brakes, the safety brake of the invention will not bind up and will not fail as long as an adequate pneumatic supply is present to actuate the pneumatic actuator 46.

Undoubtedly, numerous variations and modifications of the invention will become readily apparent to those familiar with cement truck designs and functions. Accordingly, the scope of the invention should not be construed as limited to the specific embodiment depicted and described herein, but rather is defined in the claims appended hereto.

We claim:

1. A cement truck discharge chute locking system for preventing lateral rotation of a chute ram relative to the truck chassis comprising:
    a vertically orientated ram pivot axle secured to said chute ram and rotatably mounted relative to said truck chassis,
    a first flat, annular brake element secured in horizontal disposition relative to said truck chassis and radially outwardly from said ram pivot axle and coaxial relative thereto,
    a second flat, annular brake element coupled to said ram pivot axle in coaxial alignment therewith and located radially outwardly therefrom and juxtaposed vertically adjacent to said first brake element and including,
    pneumatic actuation means having ga reciprocal plunger extending from a housing in coaxial alignment with said ram pivot axle,
    first means rigidly coupling said housing to said ram pivot axle,
    second means rigidly coupling said plunger to said second brake element, whereby said pneumatic actuation means is actuable to press said second brake element against said first brake element over an annular surface area of contact coaxial with and located radially outwardly from said ram pivot axle to thereby immobilize said ram from rotation relative to said truck chassis and alternatively deactuable to vertically separate said brake elements, thereby permitting rotation of said ram relative to said truck chassis.

2. A cement truck discharge chute locking system according to claim 1 wherein said first means is comprised of a horizontally oriented ram coupling plate rigidly secured to said ram pivot axle and connecting posts which hold said ram coupling plate in spaced separation from said pneumatic actuation means housing and said ram coupling plate has a plurality of guide openings formed therethrough, and said second means is comprised of a horizontally oriented intermediate plate located between said ram coupling plate and said pneumatic actuation means housing and guide posts extending from said intermediate plate through said guide openings in said ram coupling plate to said second brake element, whereby said guide posts move in vertically reciprocal fashion through said guide openings in said ram coupling plate during actuation and deactuation of said pneumatic actuation means.

3. A cement truck discharge chute locking system according to claim 2 wherein said ram pivot axle is coupled to said chute ram at one end and is threaded at an opposite end, and said ram coupling plate has a central opening therein and threaded means at said central opening to threadably engage said opposite end of said ram pivot axle.

4. A safety brake for a discharge chute on a cement truck in which said chute is attached to said truck by a pivotal coupling and wherein said chute is controlled in movement by a ram which is secured between said chute and a pivot axle rotatably mounted in a sleeve secured to the cement truck chassis comprising
    a first flat, annular brake pad secured relative to said cement truck chassis coaxially with and radially outwardly from said pivot axle,
    a pneumatic actuator having a housing and having an actuator stud moveable under pneumatic control in reciprocation relative to said housing in coaxial alignment with said pivot axle,
    a second brake pad secured to said actuator stud radially outwardly from and in coaxial alignment with said pivot axle and juxtaposed proximate to said first brake pad in facing relationship relative thereto, and
    means for rigidly connecting said pneumatic actuator housing to said pivot axle whereby pneumatic actuation and deactuation of said actuator moves said brake pad between a clamped condition in which said brake pads are pressed together over an annular surface area of contact coaxial with and located radially outwardly from said pivot axle, where by said brake pads are immobilized from movement relative to each other and a retracted condition in which said brake pads are separated from each other to permit rotation of said second brake pad relative to the first brake pad.

5. A safety brake according to claim 4 wherein said means for connecting said pneumatic actuator housing to said pivot axle is comprised of a ram coupling plate rigidly joined to said pivot axle, and means for rigidly holding said ram coupling plate at a distance from said pneumatic actuator housing.

6. In a cement truck having a chassis, a discharge chute mounted for rotation relative to said chassis, a ram coupled to said chute for controlling movement of said chute, a pivot axle connected to said ram remote from said chute, a mounting sleeve carrying said pivot axle and secured to said chassis, and a pneumatically actuated brake interposed between said truck chassis and said pivot axle to prevent rotation of said ram and said pivot axle relative to said mounting sleeve and said chassis when actuated and to permit rotation of said ram and said pivot axle relative to said mounting sleeve and said chassis when deactuated, and having first brake pad means secured relative to said chassis and second brake pad means releasably engageable with said first brake pad means, the improvement wherein said first and second brake pad means are both flat and annular and are both located in coaxial alignment with said pivot axle in mutually facing relationship and comprising a pneumatic actuator having a casing and an actuator plunger projecting from said casing in coaxial alignment with said pivot axle and reciprocally moveable relative thereto, means rigidly joining said pneumatic actuator casing to said pivot axle, and means rigidly joining said second brake pad means to said actuator plunger, whereby said second brake pad means is movable to a position clamped against said first brake pad means over an annular surface are a of contact coaxial with said pivot axle and said actuator plunger and alternatively a position in spaced separation therefrom.

7. A cement truck discharge chute locking system for preventing lateral rotation of a chute ram relative to the truck chassis comprising:
 a first brake element secured in horizontal disposition relative to said truck chassis,
 a vertically orientated ram pivot axle secured to said chute ram and rotatably mounted relative to said truck chassis,
 a second brake element coupled to said ram pivot axle juxtaposed vertically adjacent to said first brake element, and including
 pneumatic actuation means having a reciprocal plunger extending from a housing,
 first means comprised of first and second horizontal plates rigidly coupling said housing to said ram pivot axle and rigidly coupled together in spaced separation from each other wherein said first plate is juxtaposed against said pneumatic actuation means housing perpendicular to the orientation of said reciprocal plunger and having an aperture through which said plunger projects, and
 second means comprised of an intermediate horizontal plate located between said first and second plates and rigidly coupling said plunger to said second brake element, whereby said pneumatic actuation means is actuable to press said second brake element against said first brake element to thereby immobilize said ram from rotation relative to said truck chassis and alternatively deactuable to vertically separate said brake elements, thereby permitting rotation of said ram relative to said truck chassis.

8. A cement truck discharge chute locking system according to claim 7 wherein a plurality of openings are defined in said second plate, and said intermediate plate is rigidly joined to said plunger and said second means is further comprised of a plurality of guide posts which pass through said openings in said second plate and rigidly join said intermediate plate to said second brake element, whereby said second means is movable in vertical reciprocation relative to said first means.

9. A safety brake for a discharge chute on a cement truck in which said chute is attached to said truck by a pivotal coupling and wherein said chute is controlled in movement by a ram which is secured between said chute and a pivot axle rotatably mounted in a sleeve secured to the cement truck chassis comprising
 a pneumatic actuator having a housing and having an actuator stud moveable under pneumatic control in reciprocation relative to said housing,
 a first brake pad secured relative to said cement truck chassis,
 a second brake pad secured to said actuator stud and juxtaposed proximate to said first brake pad in facing relationship relative thereto, and
 means comprising a ram coupling plate rigidly joined to said pivot axle for connecting said pneumatic actuator housing to said pivot axle,
 an intermediate plate located between said ram coupling plate and said pneumatic actuator housing and connected to said actuator stud,
 guide means joining said intermediate plate to said second brake pad, and
 means for rigidly holding said ram coupling plate at a distance from said pneumatic actuator housing, whereby pneumatic actuation and deactuation of said actuator moves said brake pad between a clamped condition in which said brake pads are pressed together immobilized from movement relative to each other and a retracted condition in which said brake pads are separated from each other to permit rotation os said second brake pad relative to said first brake pad.

10. A safety brake according to claim 9 wherein said ram coupling plate has a plurality of holes therethrough and said coupling means are guide posts which extend through said guide holes in said ram coupling plate and are reciprocal relative thereto and rigidly join said intermediate plate to said second brake pad.

11. In a cement truck having a chassis, a discharge chute mounted for rotation relative to said chassis, a ram coupled to said chute for controlling movement of said chute, a pivot axle connected to said ram remote from said chute, a mounting sleeve carrying said pivot axle and secured to said chassis, and a pneumatically actuated brake, interposed between said truck chassis and said pivot axle relative to said mounting sleeve and said chassis when actuated and to permit rotation of said ram and said pivot axle relative to said mounting sleeve and said chassis when deactuated, and having first brake pad means secured relative to said chassis, and second brake pad means releasably engageable with said first brake pad means, the improvement comprising a pneumatic actuator having a casing and an actuator plunger projecting from said casing and reciprocally moveable relative thereto, means rigidly joining said pneumatic actuator casing to said pivot axle including a ram coupling plate rigidly secured to said pivot axle at its center and connecting posts at the periphery of said ram coupling plate which hold said ram coupling plate in spaced separation from said pneumatic actuator casing, and where in said ram coupling plate has a plurality of guide openings defined therethrough, and means rigidly joining said second brake pad means to said actuator plunger and including an intermediate plate located between said pneumatic actuator casing and said ram coupling plate and fastened to said actuator plunger, and guide posts which extend between said intermediate plate and said second brake pad and through said guide openings in said ram coupling plate.

* * * * *